(No Model.)

E. BOURNE.
FAUCET.

No. 591,072. Patented Oct. 5, 1897.

Witnesses
Charles M. Catlin
Evans Blake

Inventor
Edward Bourne
By Benj. R. Catlin
Attorney

THE NORRIS PETERS CO., PHOTO-LITHO., WASHINGTON, D. C.

United States Patent Office.

EDWARD BOURNE, OF ALLEGHENY, PENNSYLVANIA.

FAUCET.

SPECIFICATION forming part of Letters Patent No. 591,072, dated October 5, 1897.

Application filed February 8, 1897. Serial No. 622,561. (No model.)

*To all whom it may concern:*

Be it known that I, EDWARD BOURNE, a resident of Allegheny, in the county of Allegheny and State of Pennsylvania, have invented certain new and useful Improvements in Faucets; and I do hereby declare the following to be a full, clear, and exact description of the invention, such as will enable others skilled in the art to which it pertains to make and use the same.

The invention relates to faucets and the like, and has for its object to provide simple and durable valve-controlling devices that are easily removable for the renewal of the valve or for other purposes; and the invention consists in the construction hereinafter described and particularly pointed out.

Figure 1:
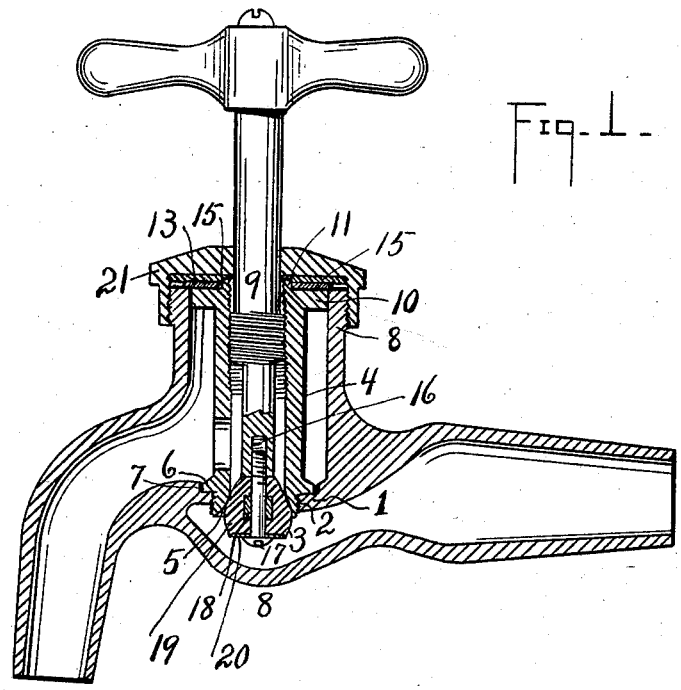
Figure 2:
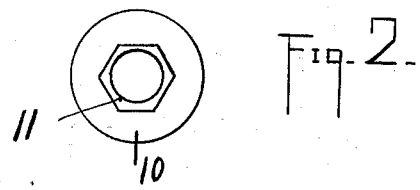

In the accompanying drawings, Figure 1 is a vertical central section. Fig. 2 is an end view of the interior valve-seat tube.

Numeral 1 denotes the usual diaphragm of a faucet except that it is provided with a screw-threaded opening 2 of greater diameter than the valve 3. Into such opening is screwed the foot of a tube 4, having a valve-seat 5.

6 denotes a flange or ring-stop integral with the tube, and 7 an annular shoulder at the junction of the diaphragm and valve-body or casing 8, within which annular shoulder the flange 6 is fitted. The valve-seat tube at its upper part is interiorly threaded to receive the suitably-threaded valve-stem 9.

10 denotes an exterior flange integral with tube 4 and situated below its polygonal head 11. Between said head and the valve-casing 8 and above the flange 10 is a packing 13, of leather or other suitable material, and above the head and fitting the valve-stem is a similar packing 15. In the lower end of the valve-stem is an opening 16, screw-threaded to receive a screw 17.

18 denotes a thimble or tube surrounding the body of the screw, and 19 an elastic valve of tubular form, preferably made of rubber.

20 denotes a washer. The thimble 18 is made shorter than the passage through the valve and of larger diameter, being in practice bedded in the material composing the body of the valve, so that at the ends of said thimble the material of the valve bears on the screw and also receives the impression of the entire washer and of the end of the valve-rod when the valve is secured in place by the screw 17. By this construction the joints next the screw are thoroughly packed and the cutting out of the interior of the valve by the valve-stem and screw is obviated, and the form and proper situation of the valve are longer maintained, while it provides for the easy renewal of the valve when worn. In ordinary use the valve-stem is screwed up and down within the valve-seat tube to close or open the valve. The tube 4, together with the valve-stem and valve, can be removed from the valve casing or body by unscrewing the cap 21 and applying a suitable tool to the polygonal tube-head 11 to unscrew the tube from the diaphragm; or the valve-stem may be screwed up until the valve is compressed in its seat sufficiently to produce friction to prevent the separate rotation of the stem, whereupon the stem and valve-seat tube turn together and unscrew the latter from its seat in the diaphragm. Obviously the cap can be unscrewed simultaneously with the latter operation.

Having described my invention, what I claim is—

1. The valve for faucets and the like comprising an elastic tubular body, an inner thimble of less length than the body, a screw passing freely through the thimble, and a valve-stem, the latter being threaded to receive the screw, whereby the valve-body is compressible between the stem and the head of the screw, substantially as described.

2. In a faucet or the like, the valve and valve-stem, the removable valve-seat tube provided with an angular head and a flange below said head, combined with the valve-casing having a diaphragm, and with the cap and the two washers between the cap and flange, one washer surrounding the head, and one surrounding and fitting the valve-stem, substantially as described.

In testimony whereof I have signed this specification in the presence of two subscribing witnesses.

EDWARD BOURNE.

Witnesses:
RICHARD T. PEARSON,
SIMON KIRSCHLER.